US008864322B2

(12) United States Patent
Cammenga et al.

(10) Patent No.: US 8,864,322 B2
(45) Date of Patent: Oct. 21, 2014

(54) SHAPED REARVIEW MIRROR ASSEMBLY

(71) Applicant: Gentex Corporation, Zeeland, MI (US)

(72) Inventors: David J. Cammenga, Zeeland, MI (US); William L. Tonar, Holland, MI (US); Adam R. Heintzelman, Grand Rapids, MI (US); Autumn W. Trombka, Grand Rapids, MI (US); Gary J. Dozeman, Zeeland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 13/975,707

(22) Filed: Aug. 26, 2013

(65) Prior Publication Data

US 2014/0055836 A1 Feb. 27, 2014

Related U.S. Application Data

(60) Provisional application No. 61/692,752, filed on Aug. 24, 2012.

(51) Int. Cl.
*G02B 5/08* (2006.01)
*G02F 1/15* (2006.01)
*B60R 1/08* (2006.01)
*G02F 1/00* (2006.01)

(52) U.S. Cl.
CPC . *B60R 1/088* (2013.01); *G02B 5/08* (2013.01); *G02F 1/0018* (2013.01)
USPC ............................ 359/608; 359/273; 359/838

(58) Field of Classification Search
CPC .................... B60R 1/02–1/089; G02F 1/0018; G02F 1/0027; G02B 5/08; G02B 5/0808; G02B 5/0816
USPC .................................. 359/273, 275, 838–884
See application file for complete search history.

(56) References Cited

U.S. PATENT DOCUMENTS 3,280,701 A 10/1966 Donnelly et al.
3,807,832 A 4/1974 Castellion
(Continued)

FOREIGN PATENT DOCUMENTS

EP 0758929 1/2002
WO WO2012051500 4/2012

OTHER PUBLICATIONS

Patent Cooperation Treaty, International Searching Authority, International Search Report, Written Opinion of the International Searching Authority and Notification of Transmittal, Nov. 28, 2013, 6 Pages.
Creative Materials, Inc., Description of Pressure Sensitive Tape, series 300-01; available at http://creativematerials.com; 1 page, Feb. 14, 2011.
3M, Inc., Brochure; Reliable Tapes for the Solar Industry; 8 pages; available at the website of 3M, Inc., Sep. 2011.
3M, Inc., Brochure; Adhesive Transfer Tape with 300LSE Adhesive; 4 pages; available at the website of 3M, Inc., Aug. 2001.

(Continued)

*Primary Examiner* — Darryl J Collins
(74) *Attorney, Agent, or Firm* — Scott P. Ryan

(57) ABSTRACT

A rearview mirror assembly is provided that includes a front substrate having a first surface and a second surface, a rear substrate having a third surface and a fourth surface, wherein the front substrate and the rear substrate define a cavity, a perimeter seal between the front substrate and the rear substrate, an electro-optic medium disposed in the cavity between the front substrate and the second substrate and bounded by the perimeter seal, wherein the front substrate and the second substrate have a shaped edge having continuously arcuate shape, and wherein an interface the first substrate and the second substrate is approximately 1 mm or less from an outermost portion of the rearview mirror assembly.

20 Claims, 6 Drawing Sheets

(56) References Cited

U.S. PATENT DOCUMENTS

| | | |
|---|---|---|
| 3,837,129 A | 9/1974 | Losell |
| 4,902,108 A | 2/1990 | Byker |
| 5,052,163 A | 10/1991 | Czekala |
| 5,066,112 A | 11/1991 | Lynam et al. |
| 5,069,535 A | 12/1991 | Baucke et al. |
| 5,073,012 A | 12/1991 | Lynam |
| 5,076,673 A | 12/1991 | Lynam et al. |
| 5,115,346 A | 5/1992 | Lynam |
| 5,128,799 A | 7/1992 | Byker |
| 5,151,824 A | 9/1992 | O'Farrell |
| 5,158,638 A | 10/1992 | Osanami et al. |
| 5,253,109 A | 10/1993 | O'Farrell et al. |
| 5,278,693 A | 1/1994 | Theiste et al. |
| 5,280,380 A | 1/1994 | Byker |
| 5,282,077 A | 1/1994 | Byker |
| 5,294,376 A | 3/1994 | Byker |
| 5,336,448 A | 8/1994 | Byker |
| 5,379,146 A | 1/1995 | Defendini |
| 5,421,940 A | 6/1995 | Cornils et al. |
| 5,448,397 A | 9/1995 | Tonar |
| 5,649,756 A | 7/1997 | Adams et al. |
| 5,679,283 A | 10/1997 | Tonar |
| 5,682,267 A | 10/1997 | Tonar |
| 5,689,370 A | 11/1997 | Tonar |
| 5,742,026 A | 4/1998 | Dickinson |
| 5,790,298 A | 8/1998 | Tonar |
| 5,803,579 A | 9/1998 | Turnbull |
| 5,808,778 A | 9/1998 | Bauer et al. |
| 5,818,625 A | 10/1998 | Forgette et al. |
| 5,825,527 A | 10/1998 | Forgette et al. |
| 5,837,994 A | 11/1998 | Stam |
| 5,888,431 A | 3/1999 | Tonar et al. |
| D410,607 S | 6/1999 | Carter |
| 5,923,027 A | 7/1999 | Stam |
| 5,923,457 A | 7/1999 | Byker et al. |
| 5,928,572 A | 7/1999 | Tonar et al. |
| 5,940,201 A | 8/1999 | Ash et al. |
| 5,956,012 A | 9/1999 | Turnbull et al. |
| 5,990,469 A | 11/1999 | Bechtel |
| 5,998,617 A | 12/1999 | Srinivasa |
| 6,002,511 A | 12/1999 | Varaprasad |
| 6,008,486 A | 12/1999 | Stam |
| 6,020,987 A | 2/2000 | Baumann |
| 6,023,040 A | 2/2000 | Zahavi |
| 6,023,229 A | 2/2000 | Bugno et al. |
| 6,037,471 A | 3/2000 | Srinivasa |
| 6,043,452 A | 3/2000 | Bestenlehrer |
| 6,049,171 A | 4/2000 | Stam |
| 6,051,956 A | 4/2000 | Nakashimo |
| 6,062,920 A | 5/2000 | Jordan |
| 6,064,508 A | 5/2000 | Forgette et al. |
| 6,064,509 A | 5/2000 | Tonar et al. |
| 6,068,380 A | 5/2000 | Lynn et al. |
| 6,084,700 A | 7/2000 | Knapp |
| 6,102,546 A | 8/2000 | Carter |
| 6,111,683 A | 8/2000 | Cammenga |
| 6,111,684 A | 8/2000 | Forgette |
| 6,130,421 A | 10/2000 | Bechtel |
| 6,130,448 A | 10/2000 | Bauer et al. |
| 6,132,072 A | 10/2000 | Turnbull |
| 6,140,933 A | 10/2000 | Bugno |
| 6,166,848 A | 12/2000 | Cammenga et al. |
| 6,170,956 B1 | 1/2001 | Rumsey et al. |
| 6,188,505 B1 | 2/2001 | Lomprey |
| 6,193,378 B1 | 2/2001 | Tonar et al. |
| 6,193,912 B1 | 2/2001 | Theiste |
| 6,195,194 B1 | 2/2001 | Roberts et al. |
| 6,203,304 B1 | 3/2001 | Lopez Tonazzi et al. |
| 6,222,177 B1 | 4/2001 | Bechtel |
| 6,224,716 B1 | 5/2001 | Yoder |
| 6,229,435 B1 | 5/2001 | Knapp |
| 6,239,898 B1 | 5/2001 | Byker |
| 6,239,899 B1 | 5/2001 | DeVries et al. |
| 6,244,716 B1 | 6/2001 | Steenwyk |
| 6,246,507 B1 | 6/2001 | Bauer |
| 6,247,819 B1 | 6/2001 | Turnbull |
| 6,249,369 B1 | 6/2001 | Theiste et al. |
| 6,255,639 B1 | 7/2001 | Stam |
| 6,262,831 B1 | 7/2001 | Bauer |
| 6,262,832 B1 | 7/2001 | Lomprey |
| 6,268,950 B1 | 7/2001 | Ash |
| 6,281,632 B1 | 8/2001 | Stam |
| 6,291,812 B1 | 9/2001 | Bechtel |
| 6,313,457 B1 | 11/2001 | Bauer |
| 6,317,248 B1 | 11/2001 | Agrawal et al. |
| 6,335,548 B1 | 1/2002 | Roberts |
| 6,356,376 B1 | 3/2002 | Tonar |
| 6,359,274 B1 | 3/2002 | Nixon |
| 6,379,013 B1 | 4/2002 | Bechtel |
| 6,392,783 B1 | 5/2002 | Lomprey |
| 6,402,328 B1 | 6/2002 | Bechtel |
| 6,403,942 B1 | 6/2002 | Stam |
| 6,407,468 B1 | 6/2002 | LeVesque et al. |
| 6,407,847 B1 | 6/2002 | Poll et al. |
| 6,420,800 B1 | 7/2002 | LeVesque et al. |
| 6,426,485 B1 | 7/2002 | Bulgajewski |
| 6,429,594 B1 | 8/2002 | Stam |
| 6,441,943 B1 | 8/2002 | Roberts |
| 6,465,963 B1 | 10/2002 | Turnbull |
| 6,469,739 B1 | 10/2002 | Bechtel |
| 6,471,362 B1 | 10/2002 | Carter |
| 6,504,142 B2 | 1/2003 | Nixon |
| 6,512,624 B2 | 1/2003 | Tonar |
| 6,521,916 B2 | 2/2003 | Roberts |
| 6,523,976 B1 | 2/2003 | Turnbull |
| 6,545,794 B2 | 4/2003 | Ash |
| 6,587,573 B1 | 7/2003 | Stam |
| 6,606,183 B2 | 8/2003 | Ikai et al. |
| 6,614,579 B2 | 9/2003 | Roberts et al. |
| 6,635,194 B2 | 10/2003 | Kloeppner |
| 6,650,457 B2 | 11/2003 | Busscher et al. |
| 6,657,767 B2 | 12/2003 | Bonardi et al. |
| 6,700,692 B2 | 3/2004 | Tonar |
| 6,774,988 B2 | 8/2004 | Stam |
| 6,781,738 B2 | 8/2004 | Kikuchi et al. |
| 6,816,297 B1 | 11/2004 | Tonar |
| 6,861,809 B2 | 3/2005 | Stam |
| 6,870,656 B2 | 3/2005 | Tonar et al. |
| 6,950,220 B2 | 9/2005 | Abramson et al. |
| 6,968,273 B2 | 11/2005 | Ockerse |
| 7,012,729 B2 | 3/2006 | Tonazzi et al. |
| 7,042,616 B2 | 5/2006 | Tonar et al. |
| 7,064,882 B2 | 6/2006 | Tonar |
| 7,287,868 B2 | 10/2007 | Carter |
| 7,324,261 B2 | 1/2008 | Tonar et al. |
| 7,342,707 B2 | 3/2008 | Roberts |
| 7,417,717 B2 | 8/2008 | Pack |
| 7,494,231 B2 * | 2/2009 | Varaprasad et al. .......... 359/603 |
| 7,592,563 B2 | 9/2009 | Wissenbach |
| 7,663,798 B2 | 2/2010 | Tonar |
| 7,688,495 B2 | 3/2010 | Tonar et al. |
| 7,706,046 B2 | 4/2010 | Bauer et al. |
| 7,746,534 B2 | 6/2010 | Tonar et al. |
| 7,817,020 B2 | 10/2010 | Turnbull et al. |
| 7,830,583 B2 | 11/2010 | Neuman et al. |
| 7,855,755 B2 | 12/2010 | Weller et al. |
| 7,855,822 B2 | 12/2010 | Huang et al. |
| 7,864,399 B2 | 1/2011 | McCabe et al. |
| 7,978,393 B2 | 7/2011 | Tonar et al. |
| 8,035,881 B2 | 10/2011 | Luten |
| 8,243,357 B2 | 8/2012 | Kozlowski et al. |
| 2002/0021481 A1 | 2/2002 | Lin et al. |
| 2008/0197371 A1 | 8/2008 | Ottermann |
| 2008/0297879 A1 | 12/2008 | Tonar et al. |
| 2008/0302657 A1 | 12/2008 | Luten et al. |
| 2009/0296190 A1 | 12/2009 | Anderson et al. |
| 2010/0110523 A1 | 5/2010 | Varaprasad et al. |
| 2010/0110553 A1 | 5/2010 | Anderson et al. |
| 2010/0277786 A1 | 11/2010 | Anderson et al. |
| 2011/0168687 A1 | 7/2011 | Door |
| 2011/0176323 A1 | 7/2011 | Skiver et al. |
| 2011/0181727 A1 | 7/2011 | Weller et al. |
| 2011/0255141 A1 | 10/2011 | Agrawal et al. |
| 2011/0299170 A1 | 12/2011 | Harlow et al. |

(56) References Cited

U.S. PATENT DOCUMENTS

| | | |
|---|---|---|
| 2012/0038964 A1 | 2/2012 | De Wind et al. |
| 2012/0069444 A1 | 3/2012 | Campbell et al. |
| 2012/0229882 A1 | 9/2012 | Fish, Jr. et al. |
| 2012/0236388 A1 | 9/2012 | De Wind et al. |

OTHER PUBLICATIONS

3M, Inc., Brochure; Double Coated Polyethylene Foam Tapes; 4 pages; available at the website of 3M, Inc., Sep. 2002.

* cited by examiner

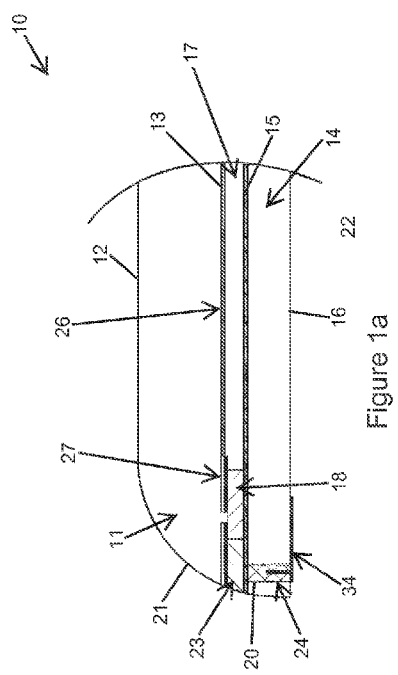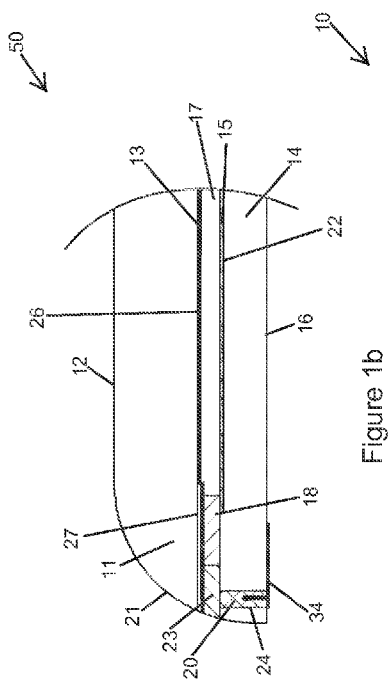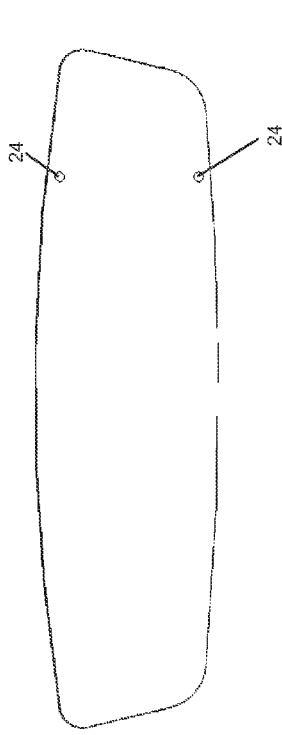

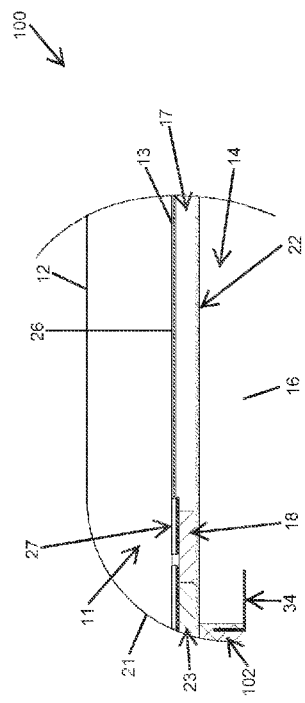
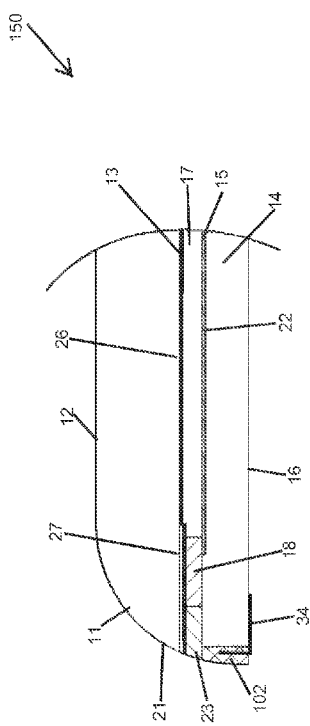
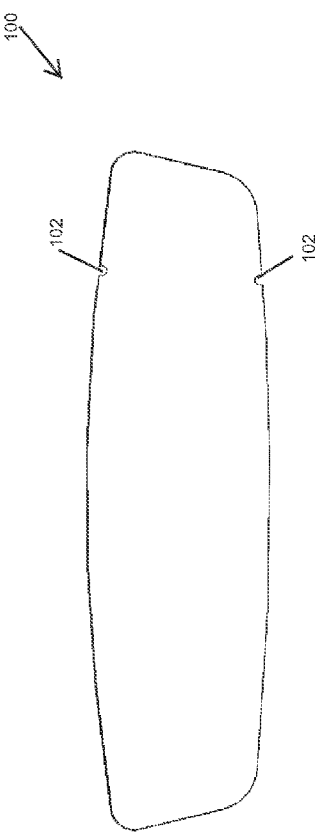

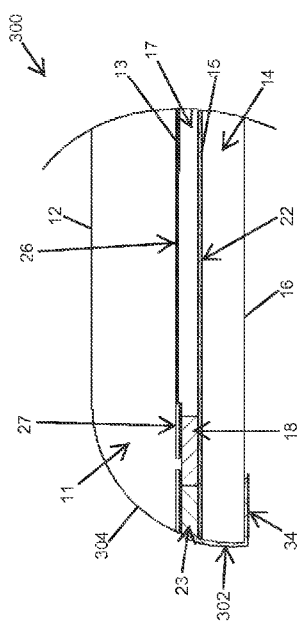
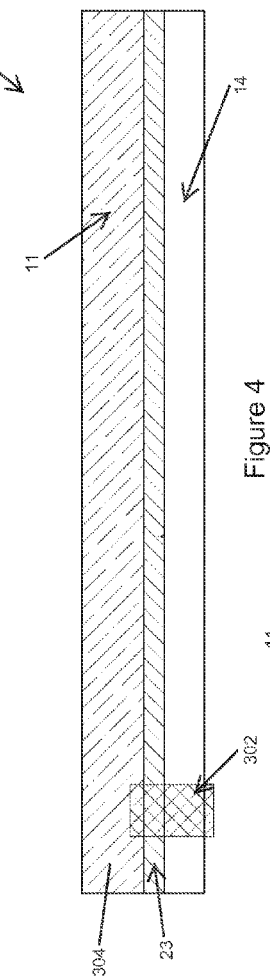
Figure 3
Figure 4
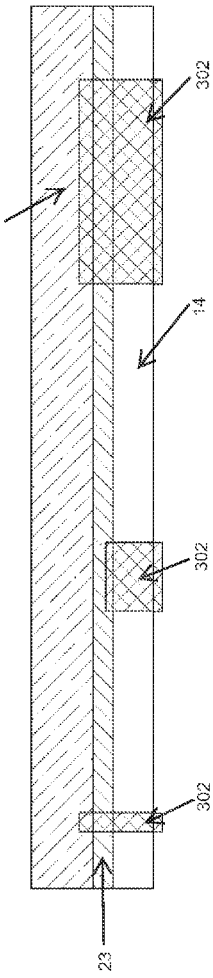
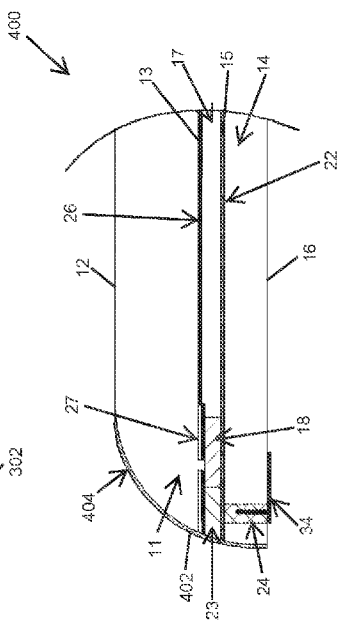
Figure 5
Figure 6

SHAPED REARVIEW MIRROR ASSEMBLY

CROSS-REFERENCE TO RELATED APPLICATION

This application claims priority to and the benefit under 35 U.S.C. §119(e) of U.S. Provisional Patent Application No. 61/692,752 filed on Aug. 24, 2012, entitled "SHAPED ELEMENT," the entire disclosure of which is hereby incorporated herein by reference.

BACKGROUND OF THE INVENTION

The present invention generally relates to a shaped element, and more specifically to a rearview mirror element, such as an electrochromic mirror assembly, that includes a shaped element.

SUMMARY OF THE PRESENT INVENTION

According to one aspect of the present invention, a rearview mirror assembly includes a front substrate having a first surface and a second surface, a rear substrate having a third surface and a fourth surface, wherein the front substrate and the rear substrate define a cavity, a perimeter seal between the front substrate and the rear substrate, an electro-optic medium disposed in the cavity between the front substrate and the second substrate and bounded by the perimeter seal, wherein the front substrate and the second substrate have a shaped edge having continuously arcuate shape, and wherein an interface the first substrate and the second substrate is approximately 1 mm or less from an outermost portion of the rearview mirror assembly.

According to another aspect of the present invention, a rearview mirror assembly includes a front substrate having a first surface and a second surface, a rear substrate having a third surface and a fourth surface, wherein the front substrate and the rear substrate define a cavity, a perimeter seal between the front substrate and the rear substrate, an electro-optic medium disposed in the cavity between the front substrate and the second substrate and bounded by the perimeter seal, wherein the front substrate and the second substrate have a shaped edge having continuously arcuate shape, and an edge coating at least partially covering the shaped edge of the first substrate and the second substrate.

According to yet another aspect of the present invention, a rearview mirror assembly includes a front substrate having a first surface and a second surface, and a rear substrate having a third surface, a fourth surface, and wherein the rear substrate defines at least one a contact via, a slot, and a notch, wherein the front substrate and the rear substrate define a cavity, a perimeter seal between the front substrate and the rear substrate, an electro-optic medium disposed in the cavity between the front substrate and the second substrate and bounded by the perimeter seal, wherein the front substrate and the second substrate have a shaped edge having an continuously arcuate shape, an edge coating at least partially covering the shaped edge of the first substrate and the second substrate, and wherein the edge coating is an ink jet material.

According to another aspect of the present invention, a rearview mirror assembly includes a front substrate having a first surface and a second surface, a rear substrate having a third surface, a fourth surface, and wherein the rear substrate defines at least one contact via, wherein the front substrate and the rear substrate define a cavity, a perimeter seal between the front substrate and the rear substrate, an electro-optic medium disposed in the cavity between the front substrate and the second substrate and bounded by the perimeter seal, wherein the front substrate and the second substrate have a shaped edge having a continuously arcuate shape, and an electrically conductive element at least partially within the contact via, wherein the electrically conductive element electrically connects with at least one of the second surface and the third surface.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1a is a partial side edge cross-sectional view of an embodiment of a rearview device of the present invention;

FIG. 1b is a partial side edge cross-sectional view of an embodiment of a rearview device of the present invention;

FIG. 1c is a front elevational view of a rearview device with contact holes, in accordance with an embodiment of the present invention;

FIG. 2a is a partial side edge cross-sectional view of an embodiment of a rearview device of the present invention;

FIG. 2b is a partial side edge cross-sectional view of an embodiment of a rearview device of the present invention;

FIG. 2c is a front elevational view of a rearview device with contact slots, in accordance with an embodiment of the present invention;

FIG. 3 is a partial side edge cross-sectional view of an embodiment of a rearview device of the present invention;

FIG. 4 is a partial side cross-sectional view of an embodiment of a rearview device of the present invention;

FIG. 5 is a partial side cross-sectional view of an embodiment of a rearview device of the present invention;

FIG. 6 is a partial side edge cross-sectional view of an embodiment of a rearview device of the present invention;

DETAILED DESCRIPTION OF EMBODIMENTS

Figure 7A:
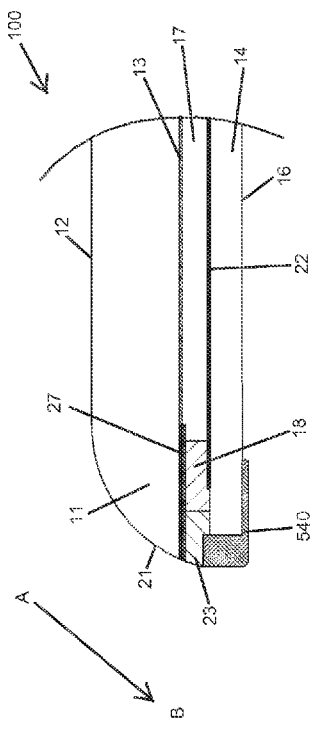
FIG. 7a is a partial side edge cross-sectional view of an embodiment of the rearview device of the present invention.

For purposes of description herein, the terms "upper," "lower," "right," "left," "rear," "front," "vertical," "horizontal," and derivatives thereof shall relate to the invention as oriented in FIG. 1a. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Traditional rearview mirror assemblies include a lip or a bezel around the perimeter of the rearview mirror element to protect the edges of the front and rear mirror substrates, while others include exposed substrate edges. For electrochromic (EC) mirror assemblies that include a front glass substrate and a rear glass substrate with a bezel, the bezel can serve to hide the edge of the mirror, the primary seal, and/or the electrical contacts, but can also protect the seal from ultra violet (UV) radiation. The bezel also protects the glass surface from impact and breakage. If the edges of the front glass substrate are exposed, the edges can be ground to shape and in some cases polished to give the edge a finished appearance and so the imperfections of the glass scribing and breaking process cannot be seen.

For an exposed edge on a rearview mirror element where there is a front substrate and a rear substrate (e.g., an electro-optic mirror), it is possible to hide the rear substrate edges by making the rear substrate smaller than the front substrate, or by creating a lip on the carrier that covers the edges of one or more of the substrates. For frameless mirror assemblies where there is no bezel or lipped carrier, a mirror assembly can include a housing that covers the edge of the rear substrate.

The assembly can also include a perimeter ring on the first surface and/or second surface of the front substrate to hide the seal and to protect the seal from ultraviolet light. The perimeter ring can substantially match the appearance of a reflector (e.g., a third surface or fourth surface reflector) in color and/or brightness or contrast it. Coatings other than metallic can be used for the perimeter ring, such as, but not limited to, metal oxides, nitrides, glass frits, organic inks, paints, coatings, the like, or a combination thereof. If the seal is hidden substantially completely behind a ground edge of the first substrate, then a perimeter coating may not be needed to "hide" the seal.

When a perimeter ring is used with either a lipped dimming mirror or with a frameless dimming mirror, the second surface ring is typically a reflector, such that when the electro-optic mirror element is dimmed, the reflectance of the ring round the perimeter of the mirror remains the same. At night, glare from headlamps viewed in this portion of the mirror can provided unwanted glare to the driver.

Referring to FIGS. 1a-6, reference numeral 10 generally designates a rearview mirror element for use with an electro-optic mirror assembly having a front substrate 11 defining a first surface 12 and a second surface 13. A rear substrate 14 defines a third surface 15 and a fourth surface 16. The front substrate 11 and the rear substrate 14 may be made of glass. The front substrate 11 and the rear substrate 14 generally define a shaped edge 21 having a substantially uniform arcuate cross-section. An electrochromic material 17 is disposed between the front substrate 11 and the rear substrate 14. A seal 18 abuts the front substrate 11 and the rear substrate 14. The seal 18 substantially surrounds the electrochromic material 17. A coating can be disposed over the shaped edge 21. An electrical bus 23 is disposed between the front substrate 11 and the rear substrate 14 proximate the seal 18.

Referring to FIGS. 1a-1c, the rearview mirror element 10 includes the front substrate 11, the rear substrate 14, and the seal 18, which generally defines a substantially continuous arc-shaped edge. In one embodiment, the front substrate 11 is connected with the rear substrate 14 and the seal 18 is installed between the front substrate 11 and the rear substrate 14. After assembly of the rearview mirror element 10, the entire rearview mirror element 10 is positioned for grinding to create a substantially continuous arc-shaped edge. In another embodiment, the front substrate 11 and the rear substrate 14 can be shaped separately and connected with the seal 18 after the grinding process is complete.

One example for a frameless design with a shaped edge is grinding the electrochromic mirror as an element, which provides a number of benefits. There is more than one approach to manufacturing a frameless electrochromic mirror. One example method is to grind the first substrate to size and to create a radius on the first substrate that has a radius of approximately 2.5 mm. Typically, to have a 2.5 mm radius, the first substrate has a thickness of at least 2.5 mm (e.g., a thickness of approximately 2.5 mm to approximately 3.5 mm). The second substrate may or may not be ground to size, but the second substrate can be behind the first substrate and generally out of view (e.g., inside a mirror housing). If the edge of the front substrate is shaped, but the edge of the rear substrate is left un-shaped, the rear substrate edge may have an aesthetically unacceptable appearance. To hide the untreated edges of the shaped edge, the edge of the rear substrate may be hidden behind the housing, bezel, or other means. If a bezel is used around the perimeter of the mirror, the overall size of the mirror is increased and forward vision may be reduced.

Another example is to grind the electrochromic element with both the first and second substrate. The shaped element can have a radius of greater than approximately 2.5 mm and can have a thickness of approximately 2.5 mm or greater. For example, the first and second substrates can be substantially flat each with a thickness of approximately 1.6 mm or greater. In another example, the substrates can be bent glass (e.g., used for outside mirrors) with each substrate having a thickness of approximately 1.6 mm or greater. In yet another example, the first substrate can have a thickness of approximately 2.2 mm and the second substrate can have a thickness of approximately 1.6 mm, and the first and second substrates can be shaped by grinding as an element.

It is aesthetically pleasing for the space between the front and rear substrates to be behind the outer edge of the shaped edge mirror when viewing substantially perpendicular to any location on the first surface of the front substrate. One advantage of using a thicker front substrate and thinner rear substrate is that for the similar shaped edge profile, a thicker front substrate moves the space toward the back of the ground element. Since a typical construction includes a primary seal between the two substrates, the edge of the seal can be hidden behind the outside edge of the part. Of course if the mirror is viewed from the side, the space between the two substrates or the primary seal will still be visible.

Referring again to FIG. 1a, the rearview mirror element 10 includes a contact 20 to a third surface reflector electrode 22. The third surface reflector electrode 22 can be substantially opaque, transflective, or a combination of both, and can include openings for displays or icons. A transparent conductive oxide (TCO) 26 is disposed on the second surface 13 and is generally surrounded by a ring 27 (e.g., a metallic ring). A contact via 24 is an opening (e.g., a hole of any shape) disposed through the rear substrate 14 that is at least partially filled with an electrically conductive material, and serves as an electrical path from the fourth surface 16 or a component rearward thereto to the third surface 15 of the rear substrate 14. A contact pad 34 is disposed proximate the fourth surface 16 and may be a metallic pad, tab, wire, etc., that extends into the contact via 24, or may make electrical contact with the electrically conductive material outside of the contact via 24. The contact pad 34 can extend into the electrically conductive material. Alternatively, the electrically conductive material may drape over an edge of the contact pad 34 and make an electrical connection on a surface of the contact pad 34, or the electrically conductive material may protrude through holes or slots in the contact pad 34.

FIG. 1b illustrates a rearview mirror element 50 having a similar construction to the rearview mirror element 10 of FIG. 1a. However, with the rearview mirror element 50, the contact pad 34 can be electrically coupled to the second surface transparent conductive oxide 26. Thus, the third surface reflector electrode 22 may not be in direct contact with the contact pad 34 through the contact via 24.

FIG. 1c illustrates a view of the rear substrate 14 and possible positions of contact via 24. The contact via 24 can be positioned in a number of locations. In one embodiment, two contact vias 24 are spaced apart near the perimeter of the rearview mirror element 10. Typically, the element electrical bus 23 will be near the edge of the front and rear substrates 11, 14, so the contact vias 24 are positioned such that each contact via 24 provides contact to the element electrical bus 23. The contact vias 24 is shown as a circle, but may be any shape including, but not limited to, an oval, a square, or a rectangle. Contact via 24 can be formed by drilling (e.g., diamond impregnated drill saw), sand blasting, water jet drilling or cutting, laser ablation, chemically etched, a laser induced channel process, the like, or a combination thereof. Examples of holes, slots, and/or vias with respect to laser induced channels are described in U.S. patent application Ser. No. 13/956,957 (unofficial) filed on Aug. 1, 2013, entitled "APPARATUS, METHOD, AND PROCESS WITH LASER INDUCED CHANNELS," the entire disclosure of which is hereby incorporated in by reference. It should be appreciated by those skilled in the art that an embodiment of FIG. 1c can be utilized in any rearview mirror element or assembly described herein.

Referring now to FIGS. 2a-2c, additional embodiments of the present invention include rearview mirror elements 100, 150 which have a shaped edge element where contact vias for contacts are made utilizing slots or notches 102 in the rear substrate that may extend approximately to the edge of the rear substrate 14 instead of holes, as shown in FIGS. 1a-1c. The rearview mirror elements 100, 150 otherwise function similarly to the rearview mirror elements 10, 50 and include similar components, as illustrated.

Figure 7B:
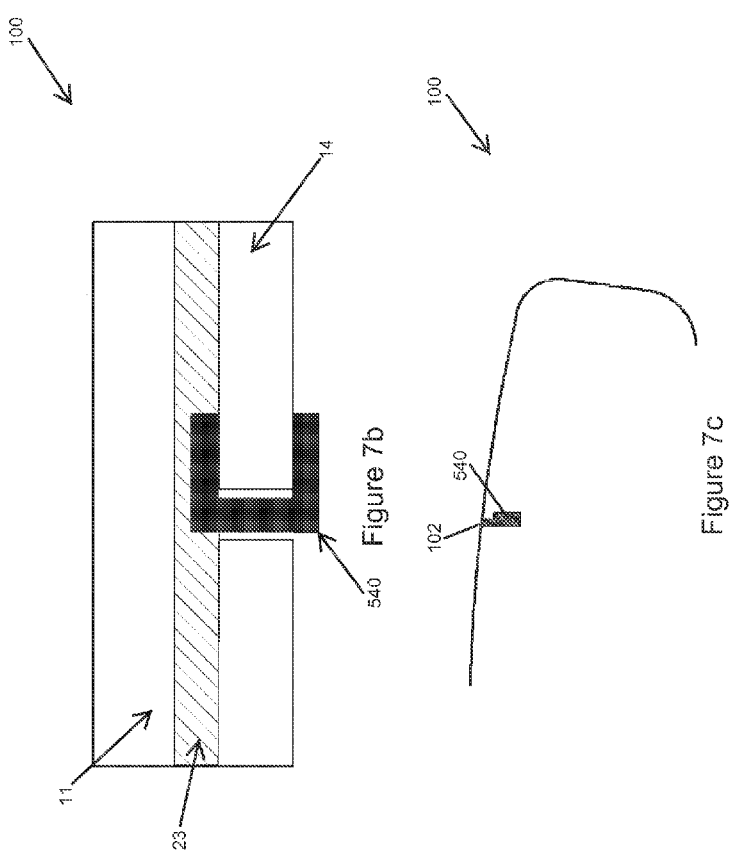
FIG. 7b is a partial side edge cross-sectional view of the rearview device in accordance with an embodiment of the present invention.
Figure 7C:
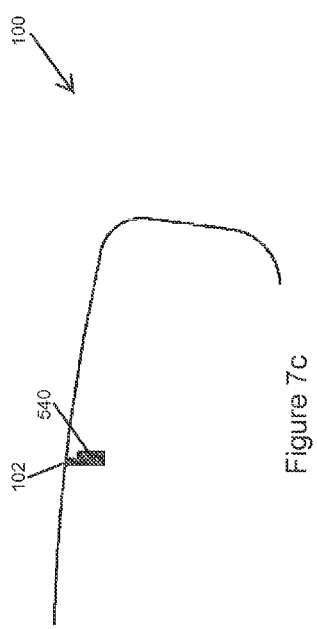
FIG. 7c is a front elevational view of a rearview device with a contact opening, in accordance with an embodiment of the present invention.

According to one embodiment having slots, as illustrated in FIGS. 7a-7c, a conductive connector (e.g., a u-clip) 540 can be configured to wrap around the rear substrate 14, and the slot 102 can be filled with an epoxy. The conductive connector 540 can be in direct electrical contact with the bus 23. The slot 102 can be less than approximately 2 mm wide, or less than approximately 1 mm wide. The conductive connector 540 can be configured to be at least partially within the slot. For example, the conductive connector 540 can have a thickness that fills at least about 25% or more of the width of the slot 102, the conductive connector 540 can be configured to have a thickness that fills at least about 50% of the width of the slot 102, or the conductive connector 540 can be configured to have a thickness that fills at least about 75% of the width of the slot 102. The conductive connector 540 can be configured to electrically connect the electrodes carried on the second surface and the third surface. Thus, the conductive connector 540 can have adequate conductivity, such that the conductive connector 540 can be, but is not limited to, a metal or metal particle filled plastic or adhesive, carbon or carbon fiber or graphine filled plastic or adhesive, a metallic film or plating applied to the substrate, slot, or via, solder, TCO, conductive polymer, a metallic wire, the like, or a combination thereof.

Referring now to FIG. 3, another embodiment of the present invention includes a rearview mirror element 300 that is made by positioning a contact at an edge of the rearview mirror element 300. This method includes applying a conductive connector or material 302 that generally wraps an edge 304 of the rearview mirror element 300 after the shaped element edge has been formed. As illustrated, the conductive material 302 wraps the edge 304 of the rearview mirror element 300 to make an electrical connection to the bus 23 disposed between the second surface 13 and the third surface 15. This wraparound electrical coating 302 may include conductive material, including an ink, epoxy, metallic coating, or the like. FIG. 4 illustrates a side view of the electrical wraparound coating 302 shown in FIG. 3. The electrical wraparound coating 302 may be of any length and there may be multiple contact positions, as generally shown in FIG. 5.

Typically, an electrical bus is generally used in an electro-optic rearview mirror element that has a low enough resistance to provide uniform potential along the edge of the rearview mirror element. For example, a rectangular rearview mirror element that is 10 inches wide and 2 inches in height may have an electrical bus extending along top and bottom edges of the rearview mirror element. When a potential is applied to one end of the bus and steady state current draw is achieved, the potential measured from one bus to the other bus at any point along either bus does not drop by more than 30 percent of the supplied potential. In some applications, potential drop of less than 20 percent is achieved. By way of explanation and not limitation, an electro-optic rearview mirror element can have a bus with a resistance below approximately 4 ohms from one end to the other, a bus with a resistance of approximately 3 ohms or less, or a combination thereof. Other materials can contribute to the overall performance of the electrical contact, but typically one low resistance bus can allow the electro-optic rearview mirror element to darken uniformly. It should be appreciated by those skilled in the art that the above description can be utilized in any rearview mirror element or assembly described herein.

In FIG. 3, for example, the bus 23 can be a low resistance bus between the second surface 13 and third surface 15 of the rearview mirror element 300. The low resistance conductive bus 23 is shown bridging between the front substrate 11 and the rear substrate 14. However, in some instances, the bus 23 may be thin and only contact one of the front substrate 11 and rear substrate 14. Alternatively, the bus could be on the fourth surface 16 and the electrically conductive material could wrap around the edge of the rearview mirror element 300 and make contact with a transparent conductive electrode carried on the second surface 26 or third surface 22. If the bus is on the fourth surface 16, it may be desirable to have multiple areas that wrap around the edge or that wrap around areas that extend along a greater length. In the illustrated example of a rearview mirror element measuring 10 inches by 2 inches, ideally the wraparound coating would additively wrap around at least about 10% of the overall length of the bus, or alternatively at least about 20% of the overall length of the bus.

For any embodiment described herein, if the sheet resistance of the electrode is low enough, a length of the bus can be reduce or the bus can be eliminated, and the conductive via or coating can be configured to electrically connect to the electrode (e.g., a direct electrical connection).

Figure 9:
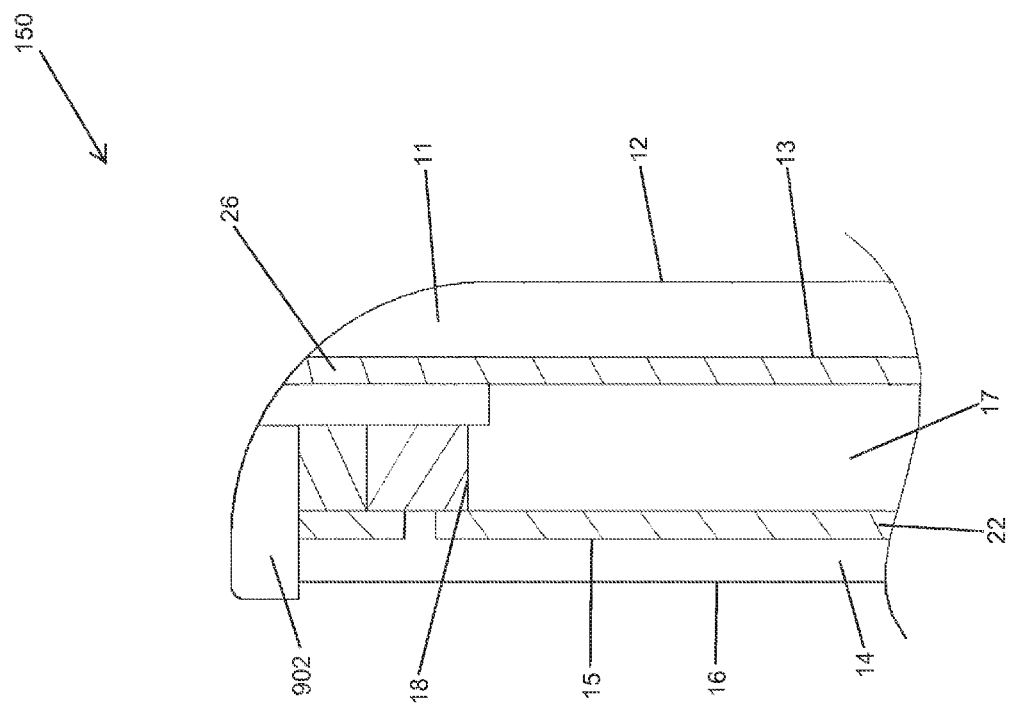
FIG. 9 is a cross-sectional view of a rearview device, in accordance with an embodiment of the present invention.

In regards to FIG. 9, a rearview mirror assembly 900 can include a notch or slot that is formed at an edge of the rear substrate 14. In such an embodiment, a conductive connector 902 can be configured to wrap around to the third surface 15. In an embodiment, wherein the mirror element is ground to form a substantially continuously arcuate edge (e.g., arcuate cross-section), the conductive connector 902 can also be ground. Additionally, the conductive connector 902 can extend approximately to an edge and at least partially fill an area and combined with the edge coating 902 to form the substantially uniform arcuate edge.

According to an embodiment, an interface between the front substrate 11 and the rear substrate 14 can be the area where the two substrates are operably connected (e.g., by the seal). For example, the interface can be at a perimeter of the second surface 13 and the perimeter of the third surface 15, according to one or more embodiments. When both the front substrate 11 and rear substrate 14 are shaped, the interface point can be in front of an outermost portion (e.g., the front of the mirror element can be the first surface), the interface point can be behind the outermost portion, or the interface point can be at the outermost portion. Since the interface can be unsightly, the interface is either behind the outermost portion or near to the outermost portion, which can reduce the visibility of the interface. The front substrate 11 can be thicker than the rear substrate 14, such as, but not limited to, the thickness of the rear substrate 14 is less than approximately 85% the thickness of the front substrate 11, the thickness of the rear substrate 14 is less than approximately 75% the thickness of the front substrate 11, the thickness of the rear substrate 14 is approximately less than 65% the thickness of the front substrate 11, the thickness of the rear substrate 14 is approximately 65% to approximately 85% the thickness of the front substrate 11, or a combination thereof.

In regards to any embodiment described herein, but with reference to FIG. 7a for explanation purposes only, when both the front substrate 11 and the rear substrate 14 are shaped (e.g., ground with a substantially continuously arcuate shape, the substrates 11, 14 either being ground together or separately), the front substrate 11 can be thicker than the rear substrate 14. In reference to the arrow in FIG. 7a that can correspond to positions along the substantially continuously arcuate shape of the substrates 11, 14, when the front substrate 11 is thicker than the rear substrate 14, the interface can be father towards the rear of the mirror element 100 or at or near the "B" portion of the arrow as opposed to the "A" portion. The interface can be less visible to a user of the mirror element 100 under normal operating conditions. Thus, the interface can be at or behind an outermost portion of the mirror element or mirror assembly excluding a mirror mount portion (e.g., configured to attach to a windscreen of a vehicle) of the mirror assembly. Additionally or alternatively, when the front substrate 11 is thicker than the rear substrate 14, the interface can be within approximately 1 mm or less of an outermost portion of the mirror element or mirror assembly excluding a mirror mount portion of the mirror assembly, the interface can be within approximately 0.8 mm or less of an outermost portion of the mirror element or mirror assembly excluding a mirror mount portion of the mirror assembly, the interface can be within approximately 0.8 mm or less of an outermost portion of the mirror element or mirror assembly excluding a mirror mount portion of the mirror assembly, the interface can be within approximately 0.6 mm or less of an outermost portion of the mirror element or mirror assembly excluding a mirror mount portion of the mirror assembly, the interface can be within approximately 0.4 mm or less of an outermost portion of the mirror element or mirror assembly excluding a mirror mount portion of the mirror assembly, the interface can be within approximately 0.2 mm or less of an outermost portion of the mirror element or mirror assembly excluding a mirror mount portion of the mirror assembly, the interface can be within approximately 1.0 mm to approximately 0.2 mm of an outermost portion of the mirror element or mirror assembly excluding a mirror mount portion of the mirror assembly, the interface can be within approximately 0.8 mm to approximately 0.2 mm of an outermost portion of the mirror element or mirror assembly excluding a mirror mount portion of the mirror assembly, the interface can be within approximately 0.6 mm to approximately 0.2 mm of an outermost portion of the mirror element or mirror assembly excluding a mirror mount portion of the mirror assembly, the interface can be within approximately 0.4 mm to approximately 0.2 mm of an outermost portion of the mirror element or mirror assembly excluding a mirror mount portion of the mirror assembly, or a combination thereof. Examples of thickness can be, but are not limited to, the front substrate 11 having a thickness of approximately 2.2 mm and the rear substrate 14 having a thickness of approximately 1.6 mm. The element can be shaped if both the front substrate 11 and the rear substrate 14 have a continuously arcuate shape, wherein the continuously arcuate shape can be continuous if there is a curved shape having any sized radius, and the continuously arcuate shape can have a constant radius or multiple radius (e.g., the radius is different depending upon the location of measuring the continuously arcuate shape), according to one or more embodiments described herein. Thus, when the front substrate 11 and the rear substrate 14 have a continuously arcuate shape, the interface can feel substantially seamless, such that the front and rear substrates are not offset from one another. By way of explanation and not limitation, a continuously arcuate shape having multiple radius of curvature can be where the edges of front substrate 11 and the rear substrate 14 approximately form a semi-circle.

It should be appreciated by those skilled in the art, that the shaped element, wherein the front substrate 11 is thicker than the rear substrate 14 can be utilized with any rearview mirror element or assembly embodiment described herein.

FIG. 6 illustrates an embodiment of a rearview mirror element 400 having a shaped edge 402 with a surface coating 404. The surface coating can be semitransparent or opaque to at least partially block the variation viewed on a side of the ground edge rearview mirror element. According to an embodiment, a mixture of approximately 10% black with approximately 90% clear ink can create a semitransparent coating which can reduce a contrast between a light colored seal and a black seal material. At approximately 10%, the coating can appear to be at least partially clear and provide substantially uniform appearance. Increasing the percentage of black ink approximately 20% to approximately 30% can cause the edge to look dark (e.g., black), and can enhance the ink to substantially hide any inconsistencies in the appearance of the edge.

Figure 8:
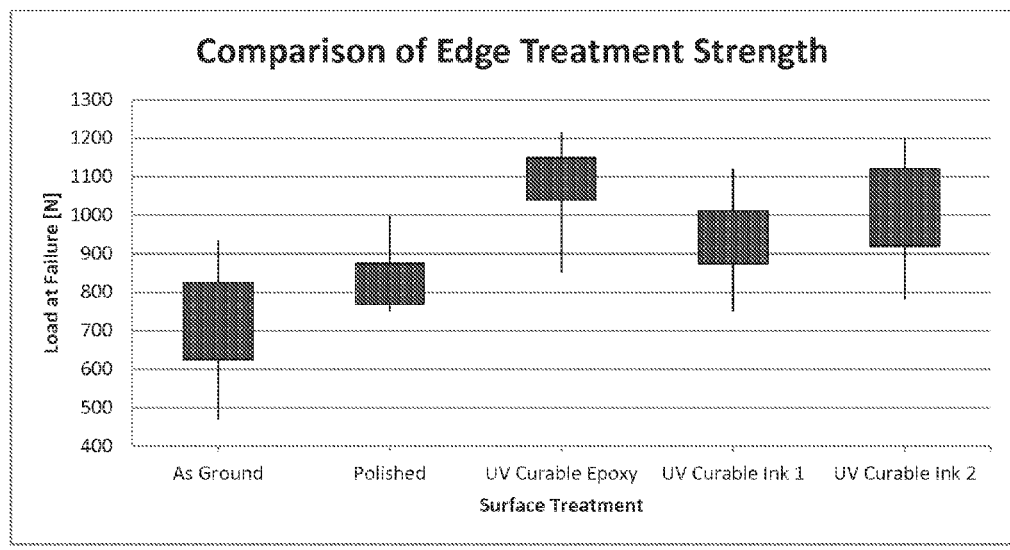
FIG. 8 is a chart illustrating a comparison of edge treatment strengths.

The surface coating 404 can provide one or more advantages. First, if the rearview mirror element 400 is shaped, the surface coating 404 may be glossy such that the surface coating 404 will give a polished appearance with minimal light-scattering to an otherwise rough light-scattering surface. A second advantage of applying the surface coating 404 is to provide additional glass strength, impact resistance, the like, or a combination thereof. Adding the surface coating 404 to the shaped glass edge 402 can increase the rupture strength of the edge 402 by approximately 20 percent or more compared to grinding alone. Additionally, the surface coating 404 can provide additional impact resistance to the glass edge 402 as the coating can be softer than the glass edge, reducing chipping and cracking FIG. 8 is a chart illustrating a comparison of parts that were coated with an epoxy, a UV-curable ink, and polished with no coating, respectively. The illustration shows that an edge coating increases the strength of the glass as compared to grinding and polishing. A third advantage of application of the surface coating 404 on the shaped edge 402 of the rearview mirror element 400 is to hide an electrical bus disposed between the front and rear substrates 11, 14. A fourth advantage of a surface coating is that, if desired, can be made to absorb UV radiation to protect any exposed sealing.

If the seal area can be hidden behind a shaped edge, a metallic or perimeter ring on the second surface may not be used.

The surface coating generally discussed herein may be clear coatings, opaque coatings, semitransparent coatings, and may be tinted or colored. In one example, a semitransparent UV curable ink (e.g., cyan ink) is used. The ink is applied and allowed to flow over the surface of the shaped edge. When cured with UV light, the ink provides a glossy tinted finish to the edge of the rearview mirror element. The color representation of cyan-magenta-yellow-black (CMYK) inks may be mixed in any ratio or multiple layers to provide a wide range of colors to the edge. A white ink may also be used alone or in combination with the CMYK inks.

Alternatively, a specific color may be formulated and applied to the surface of the glass.

The coating properties, such as, but not limited to, glossiness, texture, etc., can be generated by the process, the material properties, the like, or a combination thereof. For a less glossy surface, the ink can be manipulated in various curing parameters or various ink layers. For example, the ink can substantially cure with each pass of the inkjet head to provide a less glossy surface. This less glossy surface may be desirable to reduce the glare that can reflect off of a polished edge of glass. Glare from an edge of a rearview device can be a significant problem in an inside mirror location where sunlight hits the edge of the rearview device and the eyes of a driver are only a short distance from the rearview device.

Additionally or alternatively, the properties of the ink itself can allow for a non-glossy textured surface through incorporation of particles into the ink as deposited or incorporated in secondary process after printing but before curing the coating. The surface texture can also be manipulated by secondary imprinting process after jetting. The coated surface reflectance can also be altered by incorporation of a diffuse medium into the ink, which may appear as non-glossy surface.

According to an embodiment, curing the drops quickly after each pass may not allow the inkjet droplets to flow as much across the surface. The droplets can be cured a second or a few seconds after being jetted and before forming a smooth ink layer on the glass edge. As a result, the appearance can be duller than when the ink is allowed to flow for a longer time, for example 10 seconds or several minutes.

For another example, a clear, colorless ink (e.g., Direct Color Systems Part No. 1-7713-200) is jetted across the shaped edge of the mirror and before curing is followed by black ink (e.g., Direct Color Systems 1-7102-200) jetted over only a portion of the shaped edge. When the ink is allowed to flow, a gradient is formed with some areas clear, some areas dark, and a gradient at an interface. A gradient can also be formed by jetting clear and colored ink in a specific manner to allow blending, such as, but not limited to, with the use of dithering. It can be advantageous to have a light color or a clear color at the interface between the first surface and the grind so that the ink interface is not obvious. Adding color to the edge can be beneficial to hide portions of the edge and to provide a color that may be aesthetically pleasing. Creating a gradient provides the advantage of a clear first surface interface and the aesthetically pleasing edge. Edge features, which can be less aesthetically pleasing, can also be substantially camouflaged by jetting a pattern that can at least partially obscure those features. Patterns can be any combination of colors, textures, layers of ink, or the like, according to an embodiment. Any combination of colors, patterns, textures, and gradients can be possible with the inks Other materials and application methods are also possible. The inkjet system is used only as one example of how edge color and light scattering on the edge may be controlled. Color may be used to match interior color themes in automotive vehicles. There are many different features applying an edge coating allows. As stated herein, a surface texture of the ink can be varied by adjusting the ink formulation and application process. The ink can be loaded with a UV absorber to absorb UV, an IR absorber to absorb IR (e.g., shield photocell), colored pigments and dyes, metallic flakes or particles, coated or uncoated ceramic or glass flakes, particles, or shapes, the like, or a combination thereof. The coating can be altered to provide different aesthetic and functional effects. The edge coating as described herein can be applied to any substrate (e.g., glass) surface.

One problem with grinding an electrochromic element is that an epoxy seal and any conductive material between the two substrates can be visible on the edge of the ground device. In one example, a primary seal can be black epoxy and a conductive epoxy (e.g., silver filled epoxy) can be used between the substrate. The conductive epoxy along the edge of the part can look white or tan and stand in sharp contrast to the black epoxy. Making the primary seal and the conductive epoxy the same color can be advantageous giving the edge of the part enhanced aesthetics. This can be done by, but is not limited to, making the primary seal substantially the same color of the conductive epoxy, oxidize or tarnish the edge of the conductive epoxy to make it darker (e.g., dark brown, black, etc.) to substantially match the appearance of the primary seal.

According to one embodiment, the color of a silver filled epoxy used as an electrical bus on a shaped edge of a rearview mirror can also be at least partially changed with an oxidizing or sulfiding agent. For purposes of explanation and not limitation, an oxiding treatment for silver can be made from a mixture of hydrochloric acid and tellurium dioxide. Treatment of a silver based electrical bus with such a mixture can produce a black trace which can be less visible on the edge than portions or edges of other rearview mirrors that do not have such a silver treatment. Thus, a sulfiding agent can be used to darken the electrical bus (e.g., conductive trace) to reduce the visibility of the edge (e.g., longer lasting dark coating). Components of a sulfiding mixture can include, but are not limited to, liver of sulfur (e.g., sulfurated potash), copper sulfate combined with selenious acid, or the like.

By way of explanation and not limitation, the conductive trace treatments can be applied by spraying sulfiding solution on an outer surface of a conductive trace, allowing the chemical to react with a silver producing a darker color (e.g., dark brown, black silver sulfide, and then rinse with a liquid (e.g., water) to remove any excess sulfiding solution. The darkened trace can then be coated with a surface coating, as described herein, to produce a finished product.

It should be appreciated by those skilled in the art that any of the edge coating embodiments described herein can be utilized with any rearview mirror element or assembly embodiment described herein.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Examples of rearview devices are described in U.S. Pat. No. 6,700,692, entitled "ELECTROCHROMIC REARVIEW MIRROR ASSEMBLY INCORPORATING A DISPLAY SIGNAL LIGHT," U.S. Pat. No. 7,372,611, entitled "VEHICULAR REARVIEW MIRROR ELEMENTS AND ASSEMBLIES INCORPORATING THESE ELEMENTS," U.S. Pat. No. 8,169,684, entitled "VEHICLE REARVIEW MIRROR ELEMENTS AND ASSEMBLIES INCORPORATING THESE ELEMENTS," U.S. patent application Ser. No. 13/395,069 entitled "AUTOMOTIVE REARVIEW MIRROR WITH CAPACITIVE SWITCHES," and U.S. patent application Ser. No. 13/470,147, entitled "REARVIEW ASSEMBLY FOR A VEHICLE," all of which are hereby incorporated herein by reference in their entirety.

In describing the order of elements or components in one or more embodiments, including vehicular rearview assembly embodiments, the following convention can be generally followed herein. The order in which the surfaces of sequentially positioned structural elements of the assembly (such as a substantially transparent substrates) can be viewed is the order in which these surfaces are referred to as the first surface, the second surface, the third surface, and other surfaces if present referred to in ascending order. The term "behind" can refer to a position, in space, following something else and suggests that one element or thing is at the back of another as viewed from the front of the rearview assembly, and/or the term "in front of" can refer to a forward place or position, with respect to a particular element as viewed from the front of the assembly, according to one or more embodiments. Examples are described in U.S. Pat. No. 6,700,692, 7,372,611, and 8,169,684, and U.S. patent application Ser. Nos. 12/496,620, 12/774,721, 13/395,069 and Ser. No. 13/470,147, all of which are hereby incorporated herein by reference in their entirety.

According to at least one embodiment, the electrochromic medium can comprise at least one solvent, at least one anodic material, and at least one cathodic material.

Typically, both of the anodic and cathodic materials are electroactive and at least one of them is electrochromic. The term "electroactive" can be a material that undergoes a modification in its oxidation state upon exposure to a particular electrical potential difference, and/or the term "electrochromic" can be a material that exhibits a change in its extinction coefficient at one or more wavelengths upon exposure to a particular electrical potential difference, according to one or more embodiments.

The electrochromic medium can be one of the following categories:

(I) Single-layer, single-phase—The electrochromic medium may comprise a single-layer of material which may include small non-homogenous regions, and include solution-phase devices where a material may be contained in solution in an ionically conducting electrolyte which remains in solution in the electrolyte when electrochemically oxidized or reduced. Solution-phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Pre-selected Color," all of which are hereby incorporated herein by reference in their entirety including all references incorporated and/or cited therein.

The anodic and cathodic materials may also be combined or linked by a bridging unit as described in U.S. Pat. No. 6,241,916 entitled "Electrochromic System" and/or U.S. Patent Publication No. 2002/0015214 A1 entitled "Electrochromic Device," which are hereby incorporated herein by reference in their entirety including all references incorporated and/or cited therein. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety including all references incorporated and/or cited therein.

It is also possible to link anodic materials or cathodic materials by similar methods. The concepts described in these patents can further be combined to yield a variety of electroactive materials that are linked or coupled, including linking of a redox buffer, such as linking of a color-stabilizing moiety, to an anodic and/or cathodic material.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety including all references incorporated and/or cited therein.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," which is hereby incorporated herein by reference in its entirety including all references incorporated and/or cited therein.

Additionally, a single-layer, single-phase medium may include a medium where the anodic and cathodic materials are incorporated into a polymer matrix as is described in International Patent Application Serial No. PCT/EP98/03862 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices," which is hereby incorporated herein by reference in its entirety including all references incorporated and/or cited therein.

(II) Multi-layer—The electrochromic medium may also be prepared in layers and include a material attached directly to an electrically conducting electrode or confined in close proximity thereto which remains attached or confined when electrochemically oxidized or reduced.

(III) Multi-phase—The electrochromic medium may further be prepared using multiple phases where one or more materials in the medium undergoes a change in phase during the operation of the device, for example a material contained in solution in the ionically conducting electrolyte forms a layer on the electrically conducting electrode when electrochemically oxidized or reduced.

The present invention may be used with a mounting system such as that described in U.S. Pat. Nos. 8,201,800; 8,210,695; U.S. patent application Ser. Nos. 13/600,496; 13/527,375; 13/431,657; 13/402,701; 12/187,019, and U.S. Provisional Patent Application Nos. 61/709,716; 61/707,676; and 61/704,869, which are hereby incorporated herein by reference in their entirety. Further, the present invention may be used with a rearview packaging assembly such as that described in U.S. Pat. No. 8,264,761; U.S. patent application Ser. Nos. 13/567,363; 13/405,697; 13/402,701; and Ser. No. 13/171,950, and U.S. Provisional Patent Application Nos. 61/707,625; and 61/590,259, which are hereby incorporated herein by reference in their entirety. Additionally, it is contemplated that the present invention can include a bezel such as that described in U.S. Pat. Nos. 8,201,800; 8,210,695; and U.S. patent application Ser. No. 13/271,745, which is hereby incorporated herein by reference in its entirety.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A rearview mirror assembly comprising:
   a front substrate comprising:
      a first surface; and
      a second surface;
   a rear substrate comprising:
      a third surface; and
      a fourth surface;
   wherein said front substrate and said rear substrate define a cavity;
   a perimeter seal between said front substrate and said rear substrate;
   an electro-optic medium disposed in said cavity between said front substrate and said rear substrate and bounded by said perimeter seal;
   wherein said front substrate and said rear substrate have a shaped edge having a continuously arcuate shape; and
   wherein an interface between said front substrate and said rear substrate is approximately 1 mm or less from an outermost portion of the rearview mirror assembly.

2. The rearview mirror assembly of claim 1, wherein said interface is a perimeter of said second surface and a perimeter of said third surface.

3. The rearview mirror assembly of claim 1, wherein said outermost portion is an exterior portion of said mirror assembly excluding a mirror mount portion configured to attach to a windscreen of a vehicle.

4. The rearview mirror assembly of claim 1, wherein said front substrate is thicker than said rear substrate.

5. The rearview mirror assembly of claim 1, wherein a thickness of said rear substrate is less than approximately 85% a thickness of said front substrate.

6. The rearview mirror assembly of claim 1 further comprising an edge coating at least partially covering said shaped edge of said front substrate and said rear substrate.

7. The rearview mirror assembly of claim 6, wherein said edge coating is an ink jet material.

8. The rearview mirror assembly of claim 1, wherein said rear substrate defines at least one contact via.

9. The rearview mirror assembly of claim 8 further comprising an electrically conductive element at least partially within said contact via, wherein said electrically conductive element electrically connects with at least one of said second surface and said third surface.

10. The rearview mirror assembly of claim 9, wherein said contact via is a slot.

11. The rearview mirror assembly of claim 10, wherein said conductive element is a u-clip.

12. A rearview mirror assembly comprising:
   a front substrate comprising:
      a first surface; and
      a second surface;
   a rear substrate comprising:
      a third surface; and
      a fourth surface;
   wherein said front substrate and said rear substrate define a cavity;
   a perimeter seal between said front substrate and said rear substrate;
   an electro-optic medium disposed in said cavity between said front substrate and said rear substrate and bounded by said perimeter seal;
   wherein said front substrate and said rear substrate have a shaped edge having a continuously arcuate shape; and
   an edge coating at least partially covering said shaped edge of said front substrate and said rear substrate.

13. The rearview mirror assembly of claim 12, wherein said edge coating is substantially clear.

14. The rearview mirror assembly of claim 12, wherein said edge coating is at least partially opaque.

15. The rearview mirror assembly of claim 12, wherein said edge coating is at least one of black, textured, and patterned.

16. The rearview mirror assembly of claim 12, wherein said edge coating is an ink jet material.

17. The rearview mirror assembly of claim 12, wherein said rear substrate defines at least one contact via.

18. The rearview mirror assembly of claim 17 further comprising an electrically conductive element at least partially within said contact via, wherein said electrically conductive element electrically connects with at least one of said second surface and said third surface.

19. A rearview mirror assembly comprising:
a front substrate comprising:
   a first surface; and
   a second surface;
a rear substrate comprising:
   a third surface;
   a fourth surface; and
   wherein said rear substrate defines at least one contact via;
wherein said front substrate and said rear substrate define a cavity;
a perimeter seal between said front substrate and said rear substrate;
an electro-optic medium disposed in said cavity between said front substrate and said rear substrate and bounded by said perimeter seal;
wherein said front substrate and said substrate have a shaped edge having a continuously arcuate shape; and
an electrically conductive element at least partially within said at least one contact via, wherein said electrically conductive element electrically connects with at least one of said second surface and said third surface.

20. The rearview mirror assembly of claim 19, further comprising an electrically conductive element at least partially within said at least one contact via, wherein said electrically conductive element electrically connects with at least one of said second surface and said third surface.

* * * * *

UNITED STATES PATENT AND TRADEMARK OFFICE
CERTIFICATE OF CORRECTION

PATENT NO. : 8,864,322 B2  Page 1 of 1
APPLICATION NO. : 13/975707
DATED : October 21, 2014
INVENTOR(S) : David J. Cammenga et al.

It is certified that error appears in the above-identified patent and that said Letters Patent is hereby corrected as shown below:

In the Specification

Col. 8, line 58;

After "cracking" insert --.--;

In the Claims

Col. 15, claim 19, line 22;

After "said (2nd occurrence)" insert --rear--.

Signed and Sealed this
Twenty-third Day of June, 2015

Michelle K. Lee
*Director of the United States Patent and Trademark Office*